Aug. 30, 1949.  G. C. PEARCE  2,480,337
HEATING CIRCUIT FOR DIFFERENT VOLTAGES
Filed March 19, 1945
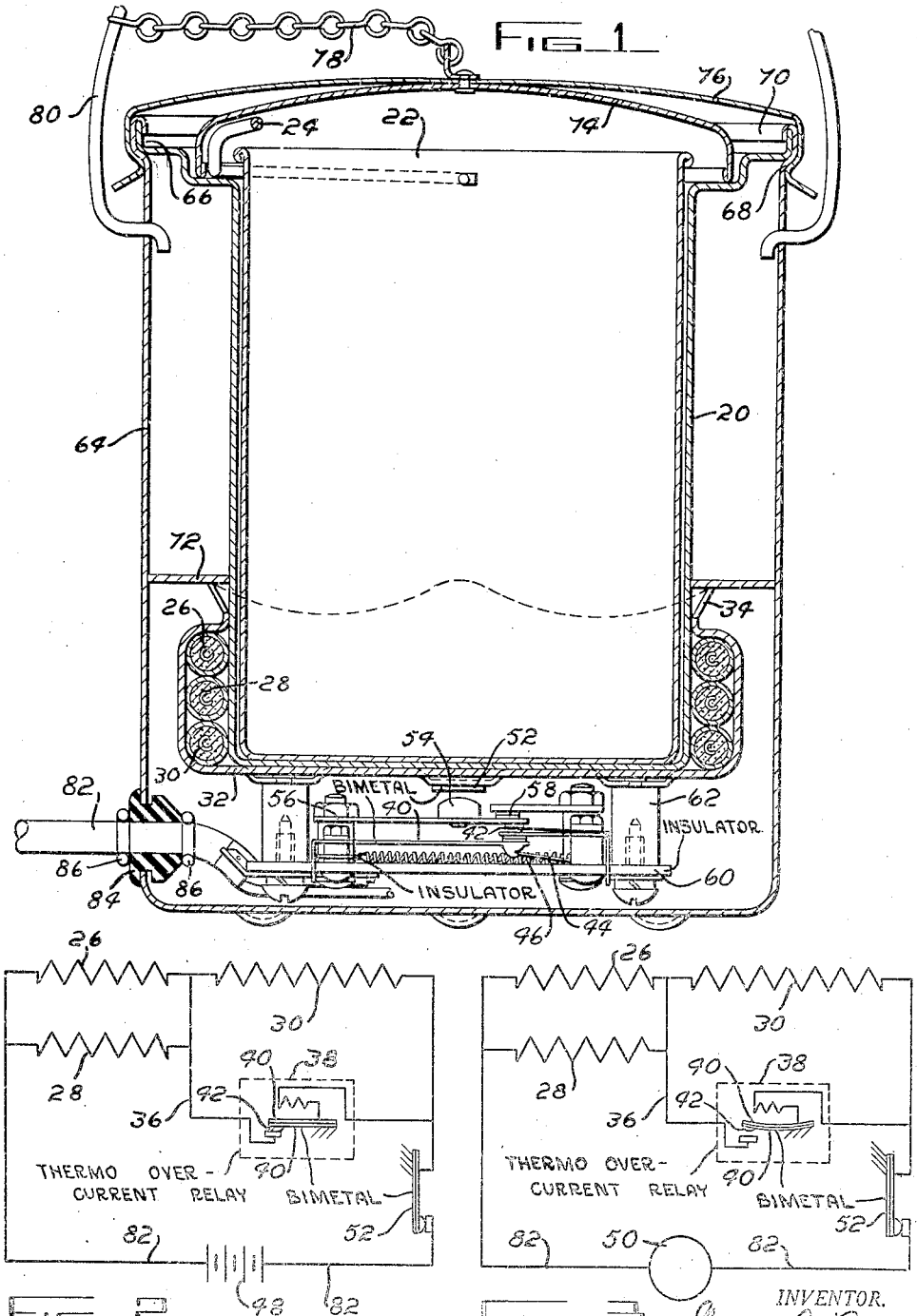

Patented Aug. 30, 1949

2,480,337

UNITED STATES PATENT OFFICE 2,480,337

HEATING CIRCUIT FOR DIFFERENT VOLTAGES

George C. Pearce, Dayton, Ohio, assignor to General Motors Corporation, Dayton, Ohio, a corporation of Delaware Application March 19, 1945, Serial No. 583,549

4 Claims. (Cl. 219—20)

This invention relates to a domestic appliance and more particularly to heaters and warming devices.

It is an object of my invention to provide a simple heating and control arrangement which will operate on either low voltage or high voltage without any manual change-over switch or dual plugs.

It is another object of my invention to provide a simple food warming device which can operate on either direct or alternating current without any manual change-over switch or dual plugs.

It is another object of my invention to provide a well insulated food warming device for either liquids or solids which can be readily cleaned without the hazard of introducing water into the electrical circuit.

It is another object of my invention to provide an improved heating and controlling arrangement for a food warming device which will automatically maintain the temperature desired.

Further objects and advantages of the present invention will be apparent from the following description, reference being had to the accompanying drawings, wherein a preferred form of the present invention is clearly shown.

In the drawings:

Fig. 1 is a vertical sectional view through a food warming device and heating means embodying one form of my invention;

Fig. 2 is a wiring diagram for the warmer shown in Fig. 1 as connected to a low voltage direct current source; and Fig. 3 is a wiring diagram for the warmer shown in Fig. 1 as connected to a high voltage alternating current power source.

The warming device consists principally of an aluminum inner cylindrical shell 20 forming a well which is adapted to receive a removable food container 22. This removable container 22 is provided with a bail 24. If desired, however, an ordinary can of food may be placed directly in the well without opening, or food may be placed directly in the well. The inner shell 20 has wrapped around the lower portion of its cylindrical surface three tubular aluminum sheathed heating elements 26, 28 and 30. These tubular sheathed heating elements each consist of coiled electrical resistance wire, such as Nichrome wire, embedded in packed magnesium oxide within aluminum tubing. These elements are held tightly in engagement with an outer cylindrical surface of the well by an aluminum retainer cup 32 which is spot-welded or otherwise suitably bonded to the bottom of the inner shell 20. This retainer cup tightly engages the outer periphery of each of the elements and its upper rim 34 is spun or bent inwardly into contact with the cylindrical surface of the inner shell 20, so as to firmly retain the sheathed heating elements 26, 28 and 30. The sheathed heating elements 26 and 28 are connected in parallel with each other as shown in the wiring diagrams, Figs. 2 and 3. The sheathed heating element 30 is connected in series with these elements. A shunt circuit 36 is provided for shunting the heating element 30. This shunt circuit includes a thermal over-current relay or protector 38 including a bimetal actuating element 40, contacts 42, a toggle lever 44 and a tension toggle spring 46.

The heating elements 26 and 28 are made of such a resistance that they provide the desired rate of heating when connected to the low voltage direct current source, such as the battery 48 for which they are designed. For example, if a 24 volt battery supply is contemplated these resistances may have a resistance of about 7.7 ohms each as to provide 74 watts each at about 3.1 amperes each. The thermal over-current relay should have such a tripping value that it will open when the high voltage alternating current supply 50 is applied to the circuit. This will open the shunt circuit 36 and place the heating elements 26 and 28 in series with the resistance 30 so as to reduce the current flow through the elements 26 and 28 to a sufficient amount to prevent them being damaged. The resistance of the heating element 30 should be selected so that, together with the heating elements 26 and 28 the desired heating rate will be provided when connected to the particular alternating current source for which it is designed.

For example, if a 110 volt alternating current source is contemplated the heating elements 26 and 28 may give a combined heating rate of 11 watts, while the heating element 30 may have a resistance of about 80 ohms and may give a heating rate of 142 watts upon a current flow of about 1.4 amperes. The bimetal actuating element 40 is placed sufficiently close to the bottom of the retainer cup 32 that it will be heated sufficiently principally by the heating element 30 to retain the relay or protector 38 in the open circuit position after the initial current surge.

When the heating device is connected to the alternating current power source there is an initial current surge through the shunt circuit 36 and each of the elements 28 until the relay or protector 38 trips. With the sheathed type of heating elements a considerable initial current surge is not harmful; but, in fact is beneficial in promoting rapid initial heating. As soon as the relay or protector 38 opens and the heating element 30 is heated long enough to reach its operating temperature, the relay or protector 38 will remain open due to the influence of this heat.

To control the temperature maintained by the warming device within the well 20, there is provided a second bimetal strip 52 which is welded or bonded directly to the bottom of the retainer cup 32, so that it is in excellent heat exchange relation with the bottom of the inner shell 20 as well as the removable container 22. This bimetal strip 52 is arranged so that when it reaches the desired operating or limiting temperature it will engage the button 54 of insulating material mounted upon the end of the spring strip 56 to separate the contacts 58 to open the circuit 82 connecting to the power source. This will de-energize all of the heating units until the temperature is reduced a slight amount. This bimetal temperature control will cycle substantially at this limiting operating temperature so as to maintain this temperature.

The thermal over-current relay 38 and the contacts 58 operated by the bimetal temperature control strip 52 are mounted upon an insulator 60 which in turn is supported by a plurality of posts 62 fastened to the bottom of the retainer cup 32. The inner shell 20 as well as the retainer cup 32 and the switches are enclosed in an outer shell 64 which is firmly held in spaced relation by the flange 66 provided at the rim on the inner well 20 as well as the interfitting flange 68 at the upper edge of the outer shell 64 which has its rim 70 spun over so as to tightly clamp the flange 66 against the flange 68. This prevents liquid from gaining access to the compartment between the shells. To provide further stability and to concentrate the heat in the lower portion a spacer 72 of insulating material is provided which extends between the inner and outer shells 20 and 64 and is supported upon the upper edge of the retainer cup 32.

A lid 74 is provided for closing the well in the shell 20 and it is held in place by a leaf spring 76 which snaps over the flange 68 at the upper edge of the outer shell 64. It is connected by a chain 78 to a bail 80 to prevent loss. The supply conductors 82 which connect to the contacts 58 and to the heating elements 26 and 28, extend through an aperture within the outer shell which is provided with a rubber sealing grommet 84. Strain relief rings 86 extend tightly around the supply conductors 82 on either side of the grommet 84 to protect the relay connections against a direct pull on the supply conductors.

While the form of embodiment of the invention as herein disclosed, constitutes a preferred form, it is to be understood that other forms might be adopted, as may come within the scope of the claims which follow.

What is claimed is as follows:

1. A heating means adapted to be connected to current supplies of different potentials comprising a plurality of heating element portions connected in series, a shunt circuit for one of said portions, a current responsive thermal over-current self-resetting protector connected in series with and heated by the current flowing in said shunt circuit and located in sufficiently good heat exchange relation to one of said heating element portions to be heated sufficiently to remain open when tripped by current flowing under a high potential but insufficiently heated in any manner at a lower current potential to open or remain open.

2. A heating means adapted to be connected to current supplies of different potentials comprising a plurality of heating element portions connected in series, a shunt circuit for one of said portions, a current responsive thermal over-current self-resetting protector connected in series with and heated by the current flowing in said shunt circuit and located in sufficiently good heat exchange relation to one of said heating element portions to be heated sufficiently to remain open when tripped by current flowing under a high potential but insufficiently heated in any manner at a lower current potential to open or remain open, and a cycling thermostatic control for limiting the temperature provided by the heating element portions, said protector having a sufficiently low resetting temperature to prevent resetting upon normal cycling of said thermostatic control.

3. A heating means adapted to be connected to current supplies of predetermined low and high potentials comprising a plurality of heating element portions connected in series, a shunt circuit for one of said portions, a current responsive snap-acting thermal overload protector connected in series with said shunt circuit, said protector including a thermal motor actuating element and a series current heater located in series with the shunt circuit and in heat transfer relationship with said actuating element, said current heater having an ohmic resistance sufficiently low to provide an insufficient heating rate upon the low potential to cause the opening of said protector but a resistance sufficiently high to provide a heating rate sufficient to cause the opening of said protector upon the high potential, said protector being located in sufficient heat transfer relationship with said one of said heating element portions to cause said actuating element to be heated sufficiently to remain open when tripped by the flow of high potential current, said heat transfer relationship between the protector and said element portions being low enough to prevent the opening or holding open of the protector under the low potential.

4. A heating means adapted to be connected to current supplies of predetermined low and high potentials comprising a plurality of heating element portions connected in series, a shunt circuit for one of said portions, a current responsive snap-acting thermal overload protector connected in series with said shunt circuit, said protector including a thermal motor actuating element and a series current heater located in series with the shunt circuit and in heat transfer relationship with said actuating element, said current heater having an ohmic resistance sufficiently low to provide an insufficient heating rate upon the low potential to cause the opening of said protector but a resistance sufficiently high to provide a heating rate sufficient to cause the opening of said protector upon the high potential, said protector being located in sufficient heat transfer relationship with said one of said heating element portions to cause said actuating element to be heated sufficiently to remain open when tripped by the flow of high potential current, said heat transfer relationship between the protector and said element portions being low enough to prevent the opening or holding open of the protector under the low potential, and a cycling thermostatic control connected in series with all of said element portions for limiting the temperature provided by the heating element portions, said protector having a sufficiently low resetting temperature to prevent resetting upon normal cycling of said thermostatic control.

GEORGE C. PEARCE.

REFERENCES CITED

The following references are of record in the file of this patent:

UNITED STATES PATENTS

| Number | Name | Date |
|---|---|---|
| 1,306,542 | Hill | June 10, 1919 |
| 1,830,578 | Vaughan | Nov. 3, 1931 |
| 1,934,446 | Randolph | Nov. 7, 1933 |
| 1,956,283 | Greenman | Apr. 24, 1934 |
| 2,025,302 | Olds | Dec. 24, 1935 |
| 2,157,417 | Kneisley | May 9, 1939 |
| 2,277,605 | Palitzsch | Mar. 24, 1942 |